UNITED STATES PATENT OFFICE.

HUGO JANNASCH, OF BERNBURG, GERMANY, ASSIGNOR TO ELIZABETH CALM, OF NEW YORK, N. Y.

IMPROVEMENT IN PRESERVING COMPOUNDS.

Specification forming part of Letters Patent No. 216,414, dated June 10, 1879; application filed January 15, 1879; patented in Germany, July 31, 1877.

*To all whom it may concern:*

Be it known that I, HUGO JANNASCH, of the city of Bernburg, in the Empire of Germany, have invented certain new and useful Improvements in Preserving Compounds, of which the following is a specification.

The object of this invention is to furnish an improved antiseptic compound by which fresh meats of all kinds, milk, butter, eggs, skins, fish, fruits, and vegetables may be preserved in superior manner, with great facility, and at a small expense. The compound may be applied either as a salt or in different degrees of solution, and has the advantage of exerting its influence in quick and permanent manner. It is perfectly odorless, and has only a slight salty taste, and neither impairs the color of the articles prepared therewith nor exerts the least deleterious influence upon the health of persons consuming the articles preserved therewith.

The invention consists of a preserving composition, which is prepared of chloride of potassium, nitrate of soda, and chemically-pure boracic acid, which ingredients are first dissolved in water, then mixed under exposure to heat, they forming, after the chemical reaction has taken place and the moisture is evaporated, an antiseptic salt, composed of hyponitrate of potash, hypochlorate of soda, borate of soda, borate of potash, and free boracic acid.

The preserving compound is prepared in the following manner and proportions: Equal parts of chloride of potassium, nitrate of soda, and chemically-pure boracic acid are dissolved in the proper quantities of water. The solution of chloride of potassium is then heated in a kettle up to the boiling-point, and then the solution of nitrate of soda added thereto. This solution is kept on a brisk fire until the lye has become perfectly clear. The solution of boracic acid is then added under continual stirring. By the influence of the boracic acid, at a temperature of 212° Fahrenheit, a reaction takes place, which is indicated by the mass assuming a yellowish color, and by the escape of chlorine gas. After the reaction has taken place the solution is slowly evaporated at a low temperature until a dry salt is obtained, which is composed of a combination of hyponitrate of potash, hypochlorate of soda, borate of soda, borate of potash, and free boracic acid.

This compound is applied to the articles to be preserved, either as a salt or in a more or less strong solution, according to the time for which the same are to be preserved, or in connection with sugar or salt, as the case may be. It may then be used for domestic, manufacturing, and all such purposes in which a reliable antiseptic preparation for the preservation of meats, fruits, vegetables, and other perishable articles is required, or the formation of infusoriæ or fermentation is to be prevented.

Having thus described my invention, I claim as new and desire to secure by Letters Patent—

1. A preserving compound consisting of a chemical combination of hyponitrate of potash, hypochlorate of soda, borate of soda, borate of potash, and free boracic acid, substantially as specified.

2. The process herein described of preparing an antiseptic preserve-salt, consisting in adding to a hot solution of chloride of potassium solutions of nitrate of soda and chemically-pure boracic acid, continuing the heat and evaporating the mixture after the chemical reaction has taken place at a low temperature to a dry powder, substantially as set forth.

In testimony that I claim the foregoing as my invention I have signed my name in presence of two witnesses this 9th day of December, 1878.

HUGO JANNASCH.

Witnesses:
GOTTFRIED HERMANN THIEME,
HENRY VAN ARSDALE.